(12) United States Patent
Yoshida et al.

(10) Patent No.: US 10,949,721 B2
(45) Date of Patent: Mar. 16, 2021

(54) PRINTER SYSTEM WITH DIFFERENT TOPOLOGY FOR DETERMINING TRANSMISSION OF HEADER INFORMATION AND METHOD FOR THE SAME

(71) Applicant: Seiko Instruments Inc., Chiba (JP)

(72) Inventors: Daisuke Yoshida, Chiba (JP); Yoshio Kitamura, Chiba (JP); Tomoki Ogura, Chiba (JP); Yuichi Yoshigi, Chiba (JP)

(73) Assignee: Seiko Instruments Inc., Chiba (JP)

( * ) Notice: Subject to any disclaimer, the term of this patent is extended or adjusted under 35 U.S.C. 154(b) by 0 days.

(21) Appl. No.: 16/654,770

(22) Filed: Oct. 16, 2019

(65) Prior Publication Data

US 2020/0134406 A1 Apr. 30, 2020

(30) Foreign Application Priority Data

Oct. 30, 2018 (JP) .............................. JP2018-203472

(51) Int. Cl.
*G06F 3/12* (2006.01)
*G06K 15/00* (2006.01)
*H04L 29/06* (2006.01)

(52) U.S. Cl.
CPC .......... *G06K 15/4045* (2013.01); *H04L 69/22* (2013.01)

(58) Field of Classification Search
None
See application file for complete search history.

(56) References Cited

U.S. PATENT DOCUMENTS

| 8,861,016 B2 * | 10/2014 | Kodama ............... G06F 3/1251 |
| | | 358/1.18 |
| 9,156,279 B2 * | 10/2015 | Shima ................... G06F 3/1291 |
| 10,048,901 B2 * | 8/2018 | Takamoto ................ G07G 5/00 |
| 2005/0223309 A1 | 10/2005 | Lee et al. |

(Continued)

FOREIGN PATENT DOCUMENTS

| JP | 2005-208942 A | | 8/2005 |
| JP | 2005208942 A | * | 8/2005 |
| JP | 2017-081027 A | | 5/2017 |

OTHER PUBLICATIONS

Extended European Search Report for European Application No. 19206162.0, dated Mar. 12, 2020, 8 pages.

*Primary Examiner* — Henok Shiferaw
(74) *Attorney, Agent, or Firm* — Brinks Gilson & Lione

(57) ABSTRACT

A printer system includes an information processing device; a printer; and a display apparatus, the information processing device being configured to control the printer and the display apparatus. A topology of the information processing device and the display apparatus includes a first topology in which the display apparatus is directly connected to the information processing device and a second topology in which the display apparatus is connected to the information processing device via the printer. The information processing device includes a processor configured to transmit to the display apparatus instruction data for the display apparatus without adding header information to the instruction data in the first topology; and transmit to the printer instruction data for the display apparatus by adding header information to the instruction data in the second topology.

10 Claims, 9 Drawing Sheets

(56) References Cited

U.S. PATENT DOCUMENTS

| | | | |
|---|---|---|---|
| 2009/0066996 A1* | 3/2009 | Minowa | B41J 29/377 358/1.15 |
| 2011/0242585 A1* | 10/2011 | Inoue | G06F 3/1262 358/1.15 |
| 2012/0243046 A1* | 9/2012 | Koakutsu | G07G 1/14 358/1.15 |
| 2015/0278787 A1* | 10/2015 | Takasu | G06Q 20/204 705/24 |

* cited by examiner

FIG.1
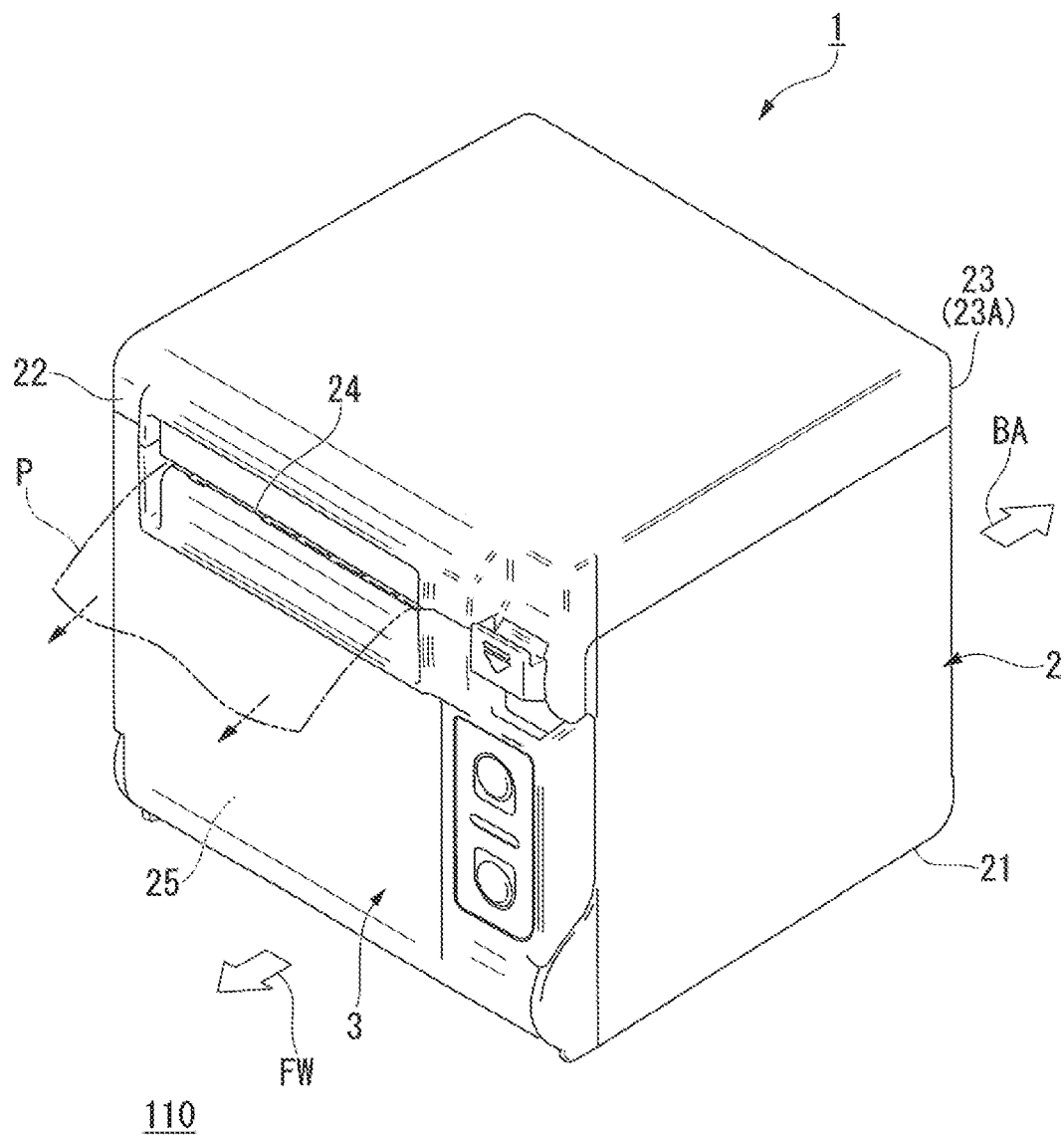
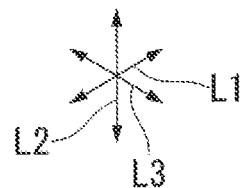

FIG.2
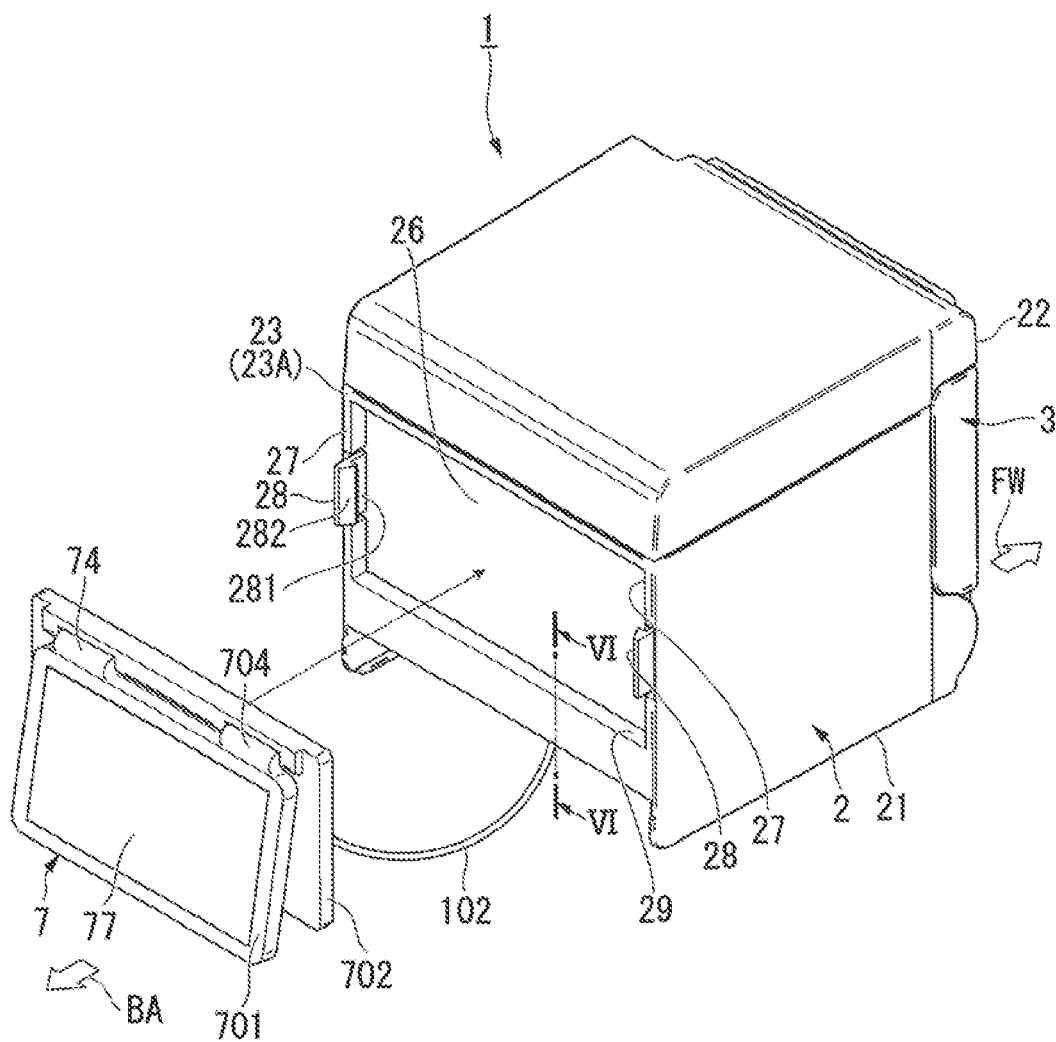
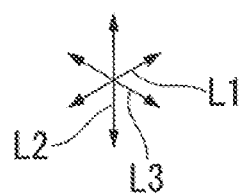

FIG.7A COMMAND DATA FOR PRINTER /g11

FIG.7B COMMAND DATA FOR DISPLAY APPARATUS /g21

FIG.7C | HEADER INFORMATION FOR DISPLAY APPARATUS /g31 | COMMAND DATA FOR DISPLAY APPARATUS /g21 | ously transmits data or the
PRINTER SYSTEM WITH DIFFERENT TOPOLOGY FOR DETERMINING TRANSMISSION OF HEADER INFORMATION AND METHOD FOR THE SAME

RELATED APPLICATIONS

This application claims priority to Japanese Patent Application No. 2018-203472, filed on Oct. 30, 2018, the entire content of which is incorporated herein by reference.

BACKGROUND OF THE INVENTION

1. Field of the Invention

The present invention relates to a printer system, a printer, a method of controlling a printer system, and a method of controlling a printer.

2. Description of the Related Art

In a point-of-sales (POS) system, a printer is connected to a host computer, for example. Further, in some POS systems, a display apparatus is connected to the POS system. The display apparatus is directly connected to the host computer or connected to the host computer via the printer.

As such a display apparatus, there has been used a vacuum fluorescent display or a single-color liquid crystal display (LCD). In recent years, a display apparatus employing a high-definition color LCD has been required in order to cope with diversification of display content required for a customer display such as advertisement display, barcode display, or two-dimensional code display.

When the display apparatus is connected via the printer, the printer is required to determine whether data received from the host computer is data addressed to the printer itself or data for the customer display, and transmit only the data for the customer display to the customer display. Thus, when the host computer transmits data to the display apparatus, it is required to add to transmission data header data indicating that the transmission data is data for the customer display.

Further, when data received from the host computer and data received from the printer have different formats, the display apparatus is required to analyze which of the data formats the received data has, resulting in a loss of the processing capability of the host computer. Thus, in general, a common data format (e.g., format of adding header data indicating data for display apparatus) is employed regardless of whether the host computer directly transmits data or the printer transmits data.

However, in the related art, when the display apparatus is connected to the host computer via the printer, the host computer transmits data to the printer and the display apparatus in a common data format. As a result, when the high-definition color LCD is employed as the display apparatus, the related art is required to execute high-speed communication because an amount of communication data becomes much larger than that required for a single-color LCD, for example, resulting in a problem in that the cost of the system is increased in order to execute the high-speed communication.

In view of the above, in the field of this technology, there have been demanded a printer system, a printer, a method of controlling a printer system, and a method of controlling a printer, which are capable of reducing an amount of data addressed to a display apparatus.

SUMMARY OF THE INVENTION

According to one embodiment of the present invention, there is provided a printer system including an information processing device, a printer; and a display apparatus, the information processing device being configured to control the printer and the display apparatus, wherein a topology of the information processing device and the display apparatus includes a first topology in which the display apparatus is directly connected to the information processing device, and a second topology in which the display apparatus is connected to the information processing device via the printer, and wherein the information processing device includes a processor configured to transmit to the display apparatus instruction data for the display apparatus without adding header information to the instruction data in the first topology; and transmit to the printer instruction data for the display apparatus by adding header information to the instruction data in the second topology.

In the above-mentioned printer system according to the one embodiment, wherein the printer includes two printer connection portions; and an analysis processor, and wherein the analysis processor of the printer is configured to determine whether header information is added to instruction data when the information processing device is connected to a first printer connection portion of the two printer connection portions, the display apparatus is connected to a second printer connection portion of the two printer connection portions, and the analysis processor has received the instruction data from the information processing device; determine the instruction data to which the header information is added as the instruction data for the display apparatus; and transmit to the display apparatus the instruction data from which the header information is removed.

According to one embodiment of the present invention, there is provided a printer including two printer connection portions; and an analysis processor, wherein the analysis processor is configured to determine whether header information is added to instruction data when an information processing device configured to control the printer and a display apparatus is connected to a first printer connection portion of the two printer connection portions, the display apparatus is connected to a second printer connection portion of the two printer connection portions, and the analysis processor has received the instruction data from the information processing device; determine the instruction data to which the header information is added as instruction data for the display apparatus; and transmit, to the display apparatus, the instruction data from which the header information is removed.

According to one embodiment of the present invention, there is provided a printer system including an information processing device; a printer; and a display apparatus, the information processing device being configured to control the printer and the display apparatus, wherein the information processing device includes two connection portions; and a processor, wherein a topology of the printer and the display apparatus includes a first topology in which the printer is connected to a first connection portion of the two connection portions; a second topology in which the display apparatus is connected to a second connection portion of the two connection portions; and a third connection topology in which the display apparatus is connected to one of the first connection portion and the second connection portion via the printer, and wherein the processor of the information processing device is configured to, in any of the first topology, the second topology, and the third topology transmit to the printer instruction information to which header information is added; and transmit to the display apparatus instruction data without adding header information to the instruction data.

In the above-mentioned printer system according to the one embodiment, wherein the printer includes two printer connection portions; and an analysis processor, wherein the analysis processor of the printer is configured to determine whether header information is added to instruction data when the information processing device is connected to a first printer connection portion of the two printer connection portions, the display apparatus is connected to a second printer connection portion of the two printer connection portions, and the analysis processor has received the instruction data from the information processing device; determine the instruction data to which the header information is added as instruction data for the printer to thereby execute printing based on the instruction data from which the header information is removed; and determine the instruction data to which the header information is not added as instruction data for the display apparatus to thereby transmit to the display apparatus the instruction data to which the header information is not added.

According to one embodiment of the present invention, there is provided a printer including two printer connection portions; and an analysis processor, wherein the analysis processor is configured to determine whether header information is added to instruction data when the information processing device configured to control the printer and a display apparatus is connected to a first printer connection portion of the two printer connection portions, the display apparatus is connected to a second printer connection portion of the two printer connection portions, and the analysis processor has received the instruction data from the information processing device, determine the instruction data to which the header information is added as instruction data for the printer to thereby execute printing based on the instruction data from which the header information is removed; and determine the instruction data to which the header information is not added as instruction data for the display apparatus to thereby transmit to the display apparatus the instruction data to which the header information is not added.

According to one embodiment of the present invention, there is provided a method of controlling a printer system, the printer system including an information processing device; a printer; and a display apparatus, the information processing device being configured to control the printer and the display apparatus, the information processing device including a processor, the printer including two printer connection portions; and an analysis processor, a topology of the information processing device, and the display apparatus including a first topology in which the display apparatus is directly connected to the information processing device, and a second topology in which the display apparatus is connected to the information processing device via the printer, the method including transmitting to the display apparatus by the processor of the information processing device instruction data for the display apparatus without adding header information to the instruction data in the first topology; transmitting to the printer, by the processor of the information processing device, instruction data for the display apparatus by adding header information to the instruction data in the second topology; determining, by the analysis processor of the printer, whether header information is added to instruction data when the information processing device is connected to a first printer connection portion of the two printer connection portions, the display apparatus is connected to a second printer connection portion of the two printer connection portions, and the analysis processor has received the instruction data from the information processing device; and determining, by the analysis processor of the printer, the instruction data to which the header information is added as the instruction data for the display apparatus to thereby transmit to the display apparatus the instruction data from which the header information is removed.

According to one embodiment of the present invention, there is provided a method of controlling a printer, the printer including two printer connection portions; and an analysis processor, the method including determining, by the analysis processor, whether header information is added to instruction data when an information processing device configured to control the printer and a display apparatus is connected to a first printer connection portion of the two printer connection portions, the display apparatus is connected to a second printer connection portion of the two printer connection portions, and the analysis processor has received the instruction data from the information processing device; and determining, by the analysis processor, the instruction data to which the header information is added as instruction data for the display apparatus to thereby transmit to the display apparatus the instruction data from which the header information is removed.

According to one embodiment of the present invention, there is provided a method of controlling a printer system, the printer system including an information processing device; a printer; and a display apparatus, the information processing device being configured to control the printer and the display apparatus, the information processing device including two connection portions; and a processor, the printer including two printer connection portions; and an analysis processor, a topology of the printer, and the display apparatus including a first topology in which the printer is connected to a first connection portion of the two connection portions; a second topology in which the display apparatus is connected to a second connection portion of the two connection portions; and a third connection topology in which the display apparatus is connected to one of the first connection portion and the second connection portion via the printer, and the method including transmitting to the printer, by the processor of the information processing device, instruction information to which header information is added in any of the first topology, the second topology, and the third topology; transmitting to the display apparatus, by the processor of the information processing device, instruction data without adding header information to the instruction data; determining, by the analysis processor of the printer, whether header information is added to instruction data when the information processing device is connected to a first printer connection portion of the two printer connection portions, the display apparatus is connected to a second printer connection portion of the two printer connection portions, and the analysis processor has received the instruction data from the information processing device; determining, by the analysis processor of the printer, the instruction data to which the header information is added as instruction data for the printer to thereby execute printing based on the instruction data from which the header information is removed; and determining, by the analysis processor of the printer, the instruction data to which the header information is not added as instruction data for the display apparatus to thereby transmit to the display apparatus the instruction data to which the header information is not added.

According to one embodiment of the present invention, there is provided a method of controlling a printer, the printer including two printer connection portions; and an analysis processor, the method including determining, by the analysis processor, whether header information is added to instruction data when an information processing device configured to control the printer and a display apparatus is connected to a first printer connection portion of the two printer connection portions, the display apparatus is connected to a second printer connection portion of the two printer connection portions, and the analysis processor has received the instruction data from the information processing device; and determining, by the analysis processor, the instruction data to which the header information is added as instruction data for the printer to thereby execute printing based on the instruction data from which the header information is removed; and determining, by the analysis processor, the instruction data to which the header information is not added as instruction data for the display apparatus to thereby transmit to the display apparatus the instruction data to which the header information is not added.

BRIEF DESCRIPTION OF THE DRAWINGS

FIG. 1 is a perspective view of an appearance of a printer in a state in which a printer cover is closed in a first embodiment of the present invention.

FIG. 2 is an exploded perspective view of the printer in a case where a display apparatus is connected to the printer according to the first embodiment.

FIG. 7A is a diagram for illustrating an example of command data for the printer to be transmitted by the information processing device in the first embodiment.

FIG. 7B is a diagram for illustrating an example of command data for the display apparatus at a time when the display apparatus is directly connected to the information processing device in the first embodiment.

FIG. 7C is a diagram for illustrating an example of command data for the display apparatus in a case where the display apparatus is connected to the information processing device via the printer in the first embodiment.

DETAILED DESCRIPTION OF THE PREFERRED EMBODIMENTS

Figure 3A:
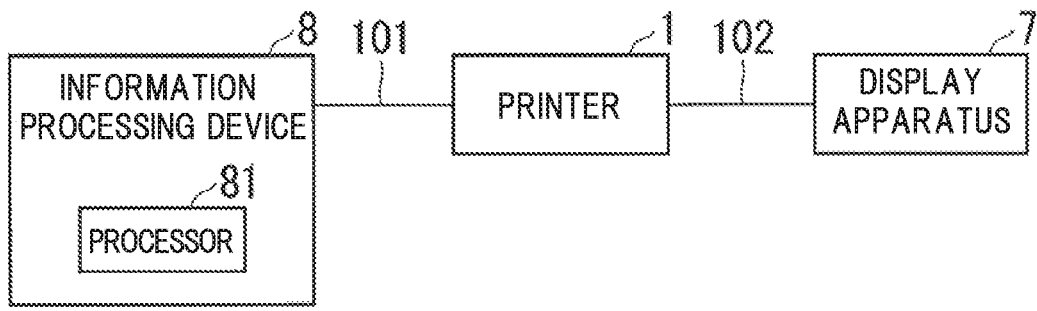
FIG. 3A is a diagram for illustrating an example of connection among an information processing device, the printer, and the display apparatus in the first embodiment.

Now, a description is given of at least one embodiment of the present invention with reference to the drawings. In the drawings referred to in the following description, the scale of each component is appropriately changed to set the size of the component recognizable.

FIG. 1 is a perspective view of an appearance of a printer in a state in which a printer cover is closed in a first embodiment of the present invention. In FIG. 1 and subsequent figures, an upper side of the drawing sheet is defined as an upward direction (upward direction in a gravity direction), and a lower side of the drawing sheet is defined as a downward direction (downward direction in the gravity direction). Further, a front-and-back direction is denoted by L1. An up-and-down direction is denoted by L2. A direction orthogonal to the front-and-back direction L1 and the up-and-down direction L2 is defined as a right-and-left direction L3. Further, a forward direction is indicated by the arrow FW, and a backward direction is indicated by the arrow BA.

As illustrated in FIG. 1, the printer 1 is a printer of a so-called "forward delivery" type, in which a recording paper P is delivered in the forward direction (on a front surface 22 side of the printer 1). The printer 1 is used under a state in which the forward direction thereof is directed to, for example, a clerk, who is a first user, and the backward direction thereof is directed to, for example, a customer, who is a second user. This usage state of the printer 1 is merely an example, and there is no particular limitation on the usage state.

The printer 1 includes a housing 2 and a printer cover 3. The housing 2 is installed on an installation surface 110 of a counter of a store. The housing 2 has a plurality of outer surfaces including a bottom surface 21, the front surface 22, and a back surface 23. The bottom surface 21 is formed, in a large part, so as to be opposed to the installation surface 110 under a state of being separated therefrom. The front surface 22 is formed of the printer cover 3 arranged in the opening 25. The back surface 23 forms a mounting surface 23A, on which a display apparatus 7 (see FIG. 2) described later is removably mounted. The mounting surface 23A is positioned on a side opposite to the front surface 22.

The printer cover 3 is coupled to a lower part of the housing 2 so as to open and close the opening 25 of the housing 2. A delivery slot 24 (gap) is formed between a distal end part of the printer cover 3 and the housing 2. The recording paper P is delivered in the forward direction from an inside of the housing 2 through the delivery slot 24.

FIG. 2 is an exploded perspective view of the printer in a case where the display apparatus is connected to the printer according to the first embodiment. As illustrated in FIG. 2, the display apparatus 7 is removably mounted on the mounting surface 23A of the housing 2, for example. The display apparatus 7 includes a display main body 701 and a display mounting portion 702.

The display main body 701 has a plate shape. One end of a connection cable 102 is connected to the display main body 701. One end of a connection cable 102 may be removably connected to the display main body 701, for example, through a connector (not shown). A display 77 is provided on the display main body 701. Data such as payment information sent from the information processing device 8 are displayed on the display 77 in the forms of characters and images.

The display mounting portion 702 has a plate shape. The display mounting portion 702 is mounted on the mounting surface 23A of the housing 2. An upper part of the display mounting portion 702 is pivotably mounted on an upper part of the display main body 701 through intermediation of pivot portions 704 formed of, for example, hinges. With the pivot portions 704, the display 77 of the display main body 701 can be changed in angle with respect to the mounting surface 23A.

A display arrangement portion 26 is formed so as to be recessed in the mounting surface 23A of the housing 2. The display mounting portion 702 is arranged in the display arrangement portion 26. The movement of a lower part of the display mounting portion 702 is regulated by holding the lower part of the display mounting portion 702 in abutment against a step portion 29 on a lower side of the display arrangement portion 26.

A pair of sandwiching portions 28 and 28 are arranged so as to be opposed to each other in edge portions 27 and 27 on the right and left sides of the display arrangement portion 26. The pair of sandwiching portions 28 and 28 is formed so as to be elastically deformable. The right and left sides of the display mounting portion 702 are sandwiched by the pair of sandwiching portions 28 and 28 through use of elastic force. In at least one embodiment, the right and left sides of the display mounting portion 702 are sandwiched by the pair of sandwiching portions 28 and 28 through snap-fitting. The shape of the printer 1 illustrated in FIG. 1 and FIG. 2 is only one example, and the shape of the printer 1 is not limited to this example. Further, the shape of the display apparatus 7 illustrated in FIG. 2 is only one example, and the shape of the display apparatus 7 is not limited to this example.

Figure 3B:
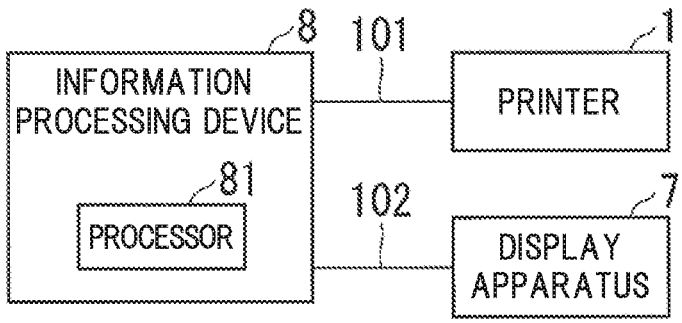
FIG. 3B is a diagram for illustrating an example of the connection among the information processing device, the printer, and the display apparatus according to the first embodiment.

Next, a description is given of an example of connection among the information processing device 8, the printer 1, and the display apparatus 7. FIG. 3A and FIG. 3B are diagrams for illustrating examples of connection among the information processing device 8, the printer 1, and the display apparatus 7 in the first embodiment. A system including the information processing device 8, the printer 1, and the display apparatus 7 is used for a point-of-sales (POS) system, for example. The POS system is installed at a store such as a retail store or a restaurant. The POS system is a system for notifying a customer of payment information (predetermined information) such as the name and price of a product purchased by the customer.

The information processing device 8 includes a processor 81 configured to execute payment processing for a product, for example. The information processing device 8 is configured to control operations of the printer 1 and the display apparatus 7. The information processing device 8 is a personal computer, for example. The printer 1 is a thermal printer, for example, and is installed at a counter of a store, for example. The display apparatus 7 is a liquid crystal display apparatus or an organic electroluminescence (EL) display apparatus, for example.

FIG. 3A is a diagram for illustrating an example of a configuration in which the printer 1 is connected to the information processing device 8 via a connection cable 101, and the display apparatus 7 is connected to the printer 1 via the connection cable 102. In the example illustrated in FIG. 3A, the printer 1 is directly connected to the information processing device 8, and the display apparatus 7 is connected to the information processing device 8 via the printer 1.

FIG. 3B is a diagram for illustrating an example of a configuration in which the printer 1 is connected to the information processing device 8 via the connection cable 101, and the display apparatus 7 is connected to the information processing device 8 via the connection cable 102. In the example illustrated in FIG. 3B, the printer 1 is directly connected to the information processing device 8, and the display apparatus 7 is also directly connected to the information processing device 8.

Figure 4:
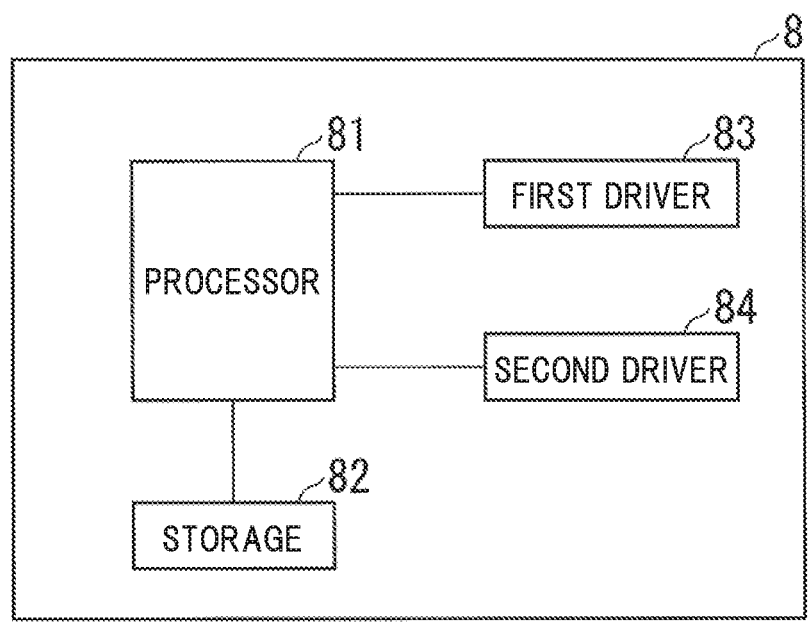
FIG. 4 is a block diagram for illustrating an exemplary configuration of the information processing device in the first embodiment.

Next, a description is given of an exemplary configuration of the information processing device 8. FIG. 4 is a block diagram for illustrating an exemplary configuration of the information processing device 8 in the first embodiment. As illustrated in FIG. 4, the information processing device 8 includes the processor 81, a storage 82, a first driver 83 (first connection portion), and a second driver 84 (second connection portion).

The processor 81 communicates to/from apparatus connected thereto (printer 1 (FIG. 3A and FIG. 3B) and display apparatus 7 (FIG. 3A and FIG. 3B)) to acquire identification information on each of the apparatus. The processor 81 adds header information to command data (instruction data) to be transmitted depending on the connected apparatus. The processor 81 outputs the command data to one of the first driver 83 and the second driver 84 to which the apparatus are connected. When an apparatus is connected to the first driver 83 or the second driver 84, the processor 81 executes communication initialization processing to acquire identification information on the apparatus. The processor 81 determines whether the connected apparatus is the printer 1 or the display apparatus 7 based on the acquired identification information, and sets a direct connection flag. The processor 81 stores the set direct connection flag into the storage 82. When the connection method is a universal serial bus (USB) standard, the communication initialization processing is negotiation processing to be executed when the printer 1 or the display apparatus 7 is connected to the information processing device 8 via a connection cable (USB cable).

The storage 82 stores identification information on the apparatus (printer 1 and display apparatus 7). The storage 82 stores header information to be added to the command data of the display apparatus 7. Further, the storage 82 stores the direct connection flag.

The first driver 83 acquires identification information on an apparatus by communicating to/from the apparatus when the apparatus is connected, in accordance with control by the processor 81. The first driver 83 transmits command data output by the processor 81 to the connected apparatus.

The second driver 84 acquires identification information on an apparatus by communicating to/from the apparatus when the apparatus is connected, in accordance with control by the processor 81. The second driver 84 transmits command data output by the processor 81 to the connected apparatus.

Figure 5:
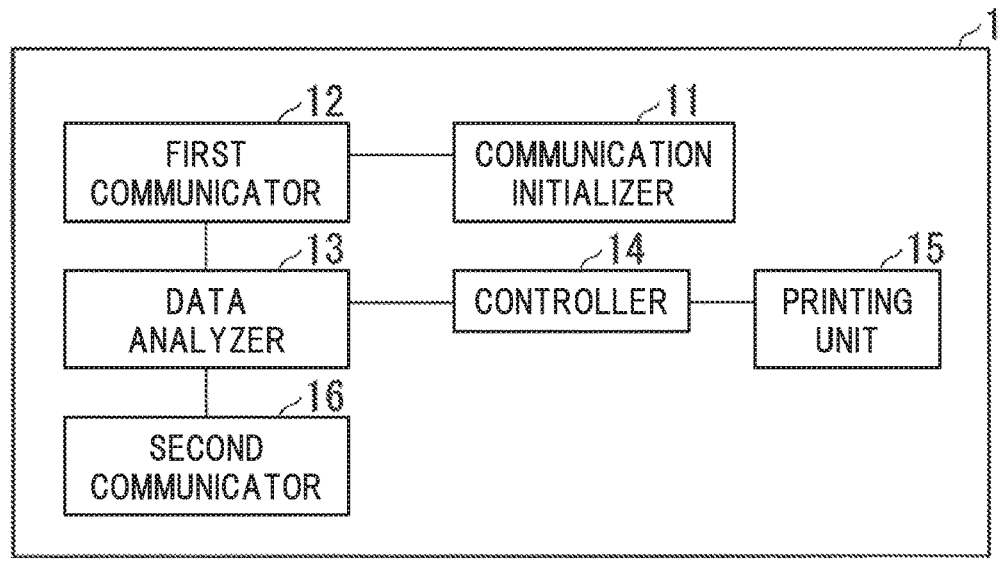
FIG. 5 is a block diagram for illustrating an exemplary configuration of the printer according to the first embodiment.

Next, a description is given of an exemplary configuration of the printer 1. FIG. 5 is a block diagram for illustrating an exemplary configuration of the printer 1 according to the first embodiment. As illustrated in FIG. 5, the printer 1 includes a communication initializer 11, a first communicator 12 (first printer connection portion), a data analyzer 13 (analysis processor), a controller 14 (analysis processor), a printing unit 15 (analysis processor), and a second communicator 16 (second printer connection portion).

As described with reference to FIG. 3A and FIG. 3B, the printer 1 is connected to, for example, the first driver 83 of the information processing device 8 via the connection cable 101 (FIG. 3A and FIG. 3B). Further, the display apparatus 7 may be connected to the printer 1 via the connection cable 102 (FIG. 3A and FIG. 3B). The information processing device 8 is connected to the first communicator 12 via the connection cable 101. Further, the display apparatus 7 is connected to the second communicator 16 via the connection cable 102.

The communication initializer 11 executes communication initialization processing to be executed at a time of establishment of connection to the information processing device 8. The communication initializer 11 stores identification information (printer information) on the printer 1.

The first communicator 12 executes negotiation by acquiring data from and outputting data to the information processing device 8 when the first communicator 12 is connected to the information processing device 8 via the connection cable 101 (FIG. 3A and FIG. 3B). At the time of negotiation, the first communicator 12 transmits printer information to the information processing device 8. Further, after the communication initialization processing, the first communicator 12 acquires command data from the information processing device 8, and outputs the acquired data to the data analyzer 13.

The data analyzer 13 acquires the command data output by the first communicator 12, and determines whether header information for the display apparatus 7 is included in the acquired command data. When header information for the display apparatus 7 is not included in the command data, the data analyzer 13 outputs the command data to the controller 14. When the display apparatus 7 is connected to the second communicator 16 via the connection cable 102, the data analyzer 13 acquires display apparatus information, which is identification information on the display apparatus 7 and is output by the second communicator 16. When header information for the display apparatus 7 is included in the command data, the data analyzer 13 outputs to the second communicator 16 command data from which the header information for the display apparatus 7 is removed.

The controller 14 generates print data based on the command data output by the data analyzer 13. The controller 14 outputs the generated print data to the printing unit 15. The printing unit 15 prints the print data generated by the controller 14.

When the display apparatus 7 is connected to the second communicator 16 via the connection cable 102 (FIG. 3A and FIG. 3B), the second communicator 16 executes negotiation by acquiring data from and outputting data to the display apparatus 7. At the time of negotiation, the second communicator 16 acquires display apparatus information, and outputs the acquired display apparatus information to the data analyzer 13. Further, after the negotiation, the second communicator 16 transmits the command data output by the data analyzer 13 to the display apparatus 7.

Specifically, when the display apparatus 7 is connected to the printer 1, the printer 1 transmits to the information processing device 8 the display apparatus information, which is identification information on the display apparatus 7 acquired through negotiation between the printer 1 and the display apparatus 7. The information processing device 8 determines whether only the printer 1 is connected or the display apparatus 7 is connected via the printer 1 based on the information received from the printer 1 in this manner.

Figure 6:
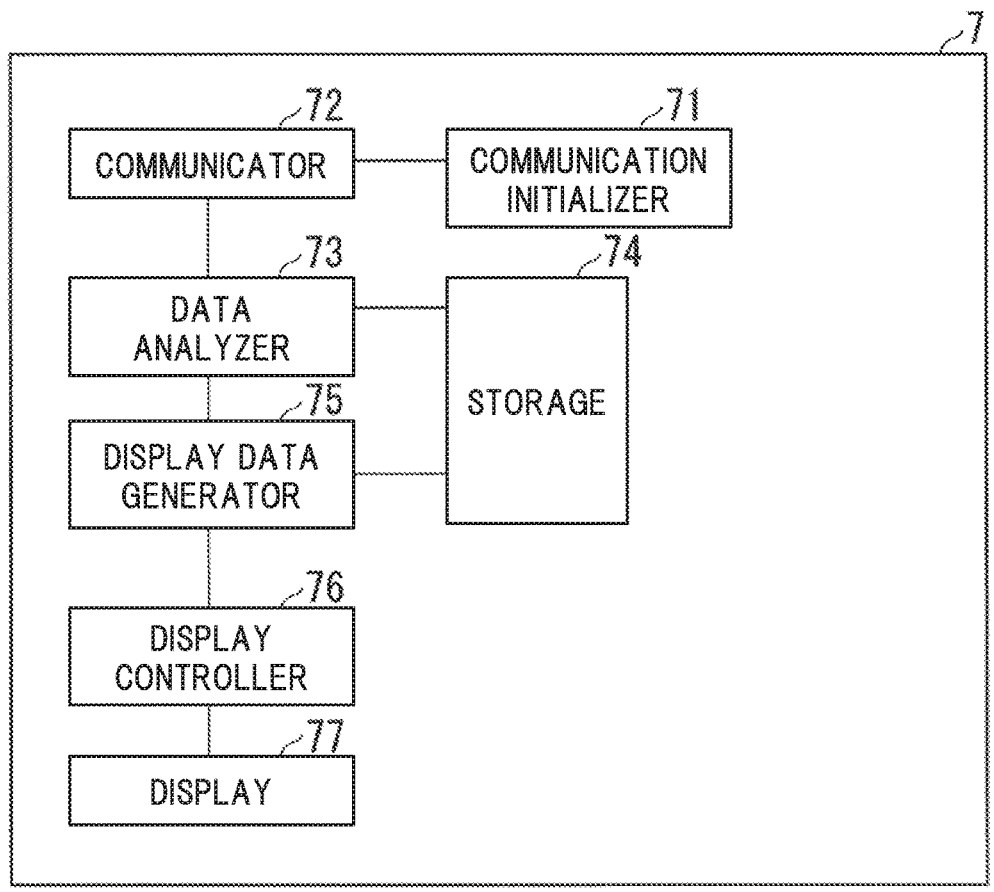
FIG. 6 is a block diagram for illustrating an exemplary configuration of the display apparatus in the first embodiment.

Next, a description is given of an exemplary configuration of the display apparatus 7. FIG. 6 is a block diagram for illustrating an exemplary configuration of the display apparatus 7 in the first embodiment. As illustrated in FIG. 6, the display apparatus 7 includes a communication initializer 71, a communicator 72, a data analyzer 73, a storage 74, a display data generator 75, a display controller 76, and a display 77.

As described with reference to FIG. 3A and FIG. 3B, the display apparatus 7 is connected to, for example, the second driver 84 of the information processing device 8 via the connection cable 102 (FIG. 3A and FIG. 3B). Alternatively, the display apparatus 7 is connected to the second communicator 16 of the printer 1 via the connection cable 102.

The communication initializer 71 executes communication initialization processing to be executed at a time of establishment of connection to the information processing device 8 or the printer 1. The communication initializer 71 stores display apparatus information on the printer 1.

The communicator 72 executes negotiation by acquiring data from and outputting data to the information processing device 8 when the communicator 72 is connected to the information processing device 8 via the connection cable 102 (FIG. 3A and FIG. 3B). At the time of negotiation, the communicator 72 transmits display apparatus information to the information processing device 8. Further, after the communication initialization processing, the communicator 72 acquires command data from the information processing device 8, and outputs the acquired data to the data analyzer 73. When the communicator 72 is connected to the printer 1 via the connection cable 102 (FIG. 3A and FIG. 3B), the communicator 72 executes negotiation by acquiring data from and outputting data to the printer 1. At the time of negotiation, the communicator 72 transmits display apparatus information to the printer 1. Further, after the communication initialization processing, the communicator 72 acquires command data from the printer 1, and outputs the acquired command data to the data analyzer 73.

The data analyzer 73 analyzes the command data output by the communicator 72, and stores the analyzed command data into the storage 74. The data analyzer 73 divides the command data into setting information, font information, image information, and the other function information, for example, to store the information into the storage 74. The data analyzer 73 outputs an analysis result obtained by analysis to the display data generator 75.

The storage 74 includes a plurality of storage regions, for example. For example, the storage 74 stores the setting information into a first storage region, stores the font information into a second storage region, stores the image information into a third storage region, and stores the other function information into a fourth storage region.

The display data generator 75 reads the setting information, font information, image information, and other function information stored in the storage 74, based on the analysis result output by the data analyzer 73. The display data generator 75 generates display data based on the read setting information, font information, image information, and other function information, and outputs the generated display data to the display controller 76.

The display controller 76 displays information on the display 77 based on the display data output by the display data generator 75.

The display 77 is a color liquid crystal display (LCD), for example.

Next, a description is given of an example of command data to be transmitted by the information processing device 8. FIG. 7A is a diagram for illustrating an example of command data for the printer to be transmitted by the information processing device 8 in the first embodiment. FIG. 7B is a diagram for illustrating an example of command data for the display apparatus at a time when the display apparatus is directly connected to the information processing device 8 in the first embodiment. FIG. 7C is a diagram for illustrating an example of command data for the display apparatus in a case where the display apparatus is connected to the information processing device 8 via the printer 1 in the first embodiment.

FIG. 7A is a diagram for illustrating an example of the command data for the printer to be transmitted by the information processing device 8. When the printer 1 is connected to the information processing device 8, the information processing device 8 transmits command data g11 for the printer to the printer 1 as command data as illustrated in FIG. 7A. As illustrated in FIG. 7A, header information for the printer is not assigned to the command data g11 for the printer.

FIG. 7B is a diagram for illustrating an example of the command data for the display apparatus at a time when the display apparatus is directly connected to the information processing device 8. When the display apparatus 7 is directly connected to the information processing device 8, the information processing device 8 transmits command data g21 for the display apparatus to the display apparatus 7 as command data as illustrated in FIG. 7B. As illustrated in FIG. 7B, header information for the display apparatus is not assigned to the command data g21 for the display apparatus.

FIG. 7C is a diagram for illustrating an example of the command data for the display apparatus in a case where the display apparatus is connected to the information processing device 8 via the printer 1. When the display apparatus 7 is connected to the information processing device 8 via the printer 1, the information processing device 8 assigns header information g31 for the display apparatus to the command data g21 for the display apparatus as illustrated in FIG. 7C, and transmits the resultant data to the display apparatus 7 as command data.

Figure 8:
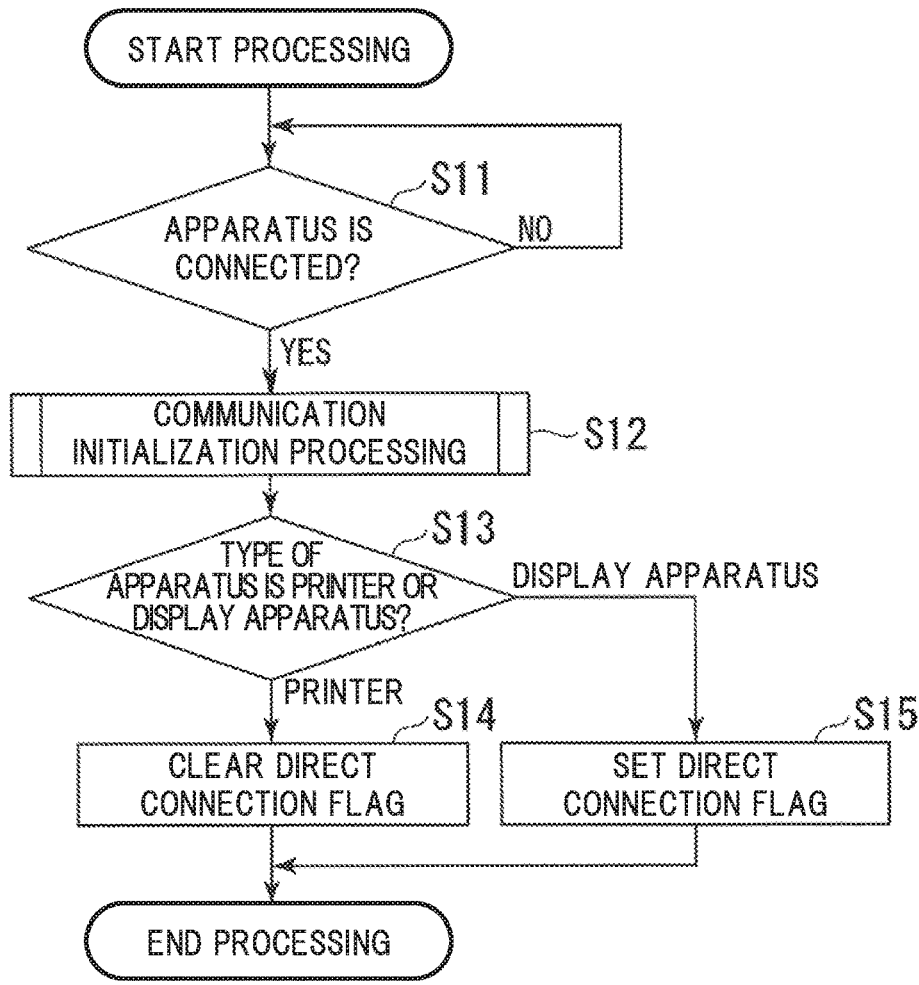
FIG. 8 is a flowchart for illustrating an example of a processing procedure of communication initialization processing to be executed by the information processing device in the first embodiment.

Now, a description is given of an example of a processing procedure of the communication initialization processing to be executed by the information processing device 8. FIG. 8 is a flowchart for illustrating an example of the processing procedure of the communication initialization processing to be executed by the information processing device 8 in the first embodiment.

(Step S11) The processor 81 checks whether an apparatus (printer 1 or display apparatus 7) is connected to any one of the first driver 83 and the second driver 84. When it is determined that an apparatus is connected (Step S11: "YES"), the processor 81 advances the processing to Step S12. When it is determined that an apparatus is not connected (Step S11: "NO"), the processor 81 repeats the processing of Step S11.

(Step S12) The processor 81 and the connected apparatus execute the communication initialization processing, and the processor 81 acquires identification information on the apparatus.

(Step S13) The processor 81 determines whether the connected apparatus is the printer 1 or the display apparatus 7 based on the acquired identification information. When it is determined that the connected apparatus is the printer 1 (Step S13: "printer"), the processor 81 advances the processing to Step S14. When it is determined that the connected apparatus is the display apparatus 7 (Step S13: "display apparatus"), the processor 81 advances the processing to Step S15.

(Step S14) The processor 81 clears the direct connection flag, that is, sets the direct connection flag to "0", for example, and stores the direct connection flag into the storage 82. After the processing, the processor 81 ends the processing.

(Step S15) The processor 81 sets the direct connection flag to "1", for example, and stores the direct connection flag into the storage 82. After the processing, the processor 81 ends the processing.

Figure 9:
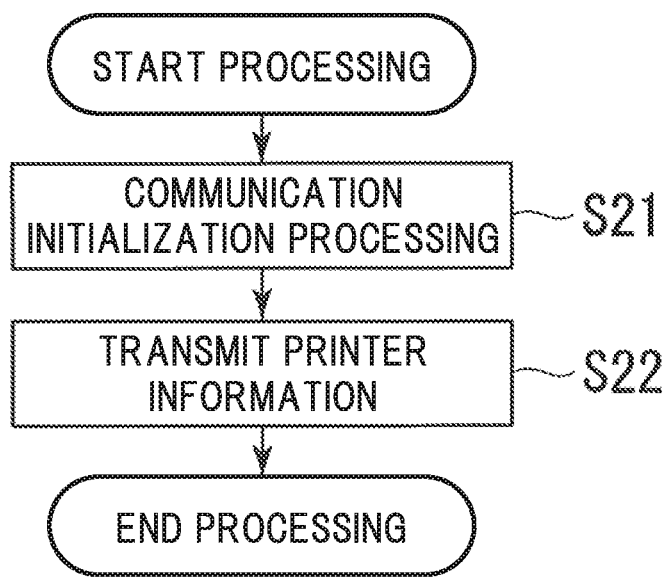
FIG. 9 is a flowchart for illustrating an example of the processing procedure of the communication initialization processing to be executed by the printer according to the first embodiment.

Next, a description is given of an example of the processing procedure to be executed by the printer 1 at the time of the communication initialization processing. FIG. 9 is a flowchart for illustrating an example of the processing procedure of the communication initialization processing to be executed by the printer 1 according to the first embodiment.

(Step S21) When the communication initializer 11 is connected to the information processing device 8 via the connection cable 101, the communication initializer 11 executes the communication initialization processing.

(Step S22) The communication initializer 11 transmits printer information, which is identification information on the printer 1, to the information processing device 8 via the first communicator 12.

Figure 10:
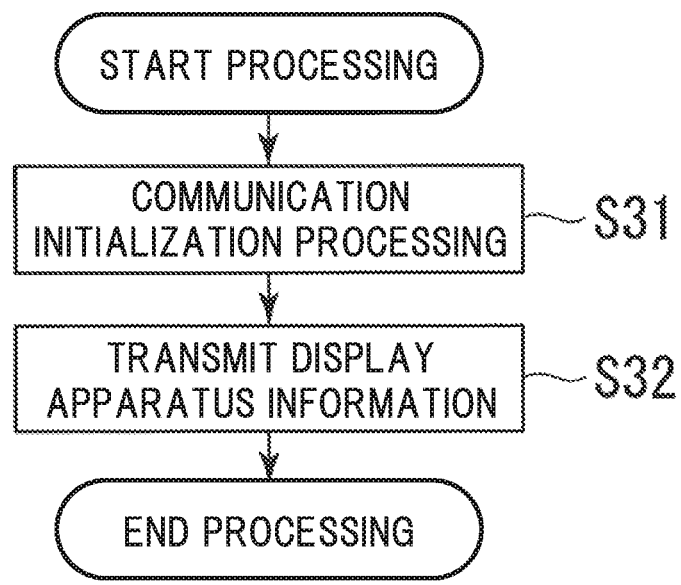
FIG. 10 is a flowchart for illustrating an example of the processing procedure of the communication initialization processing to be executed by the display apparatus in the first embodiment.

Next, a description is given of an example of the processing procedure to be executed by the display apparatus 7 at the time of the communication initialization processing. FIG. 10 is a flowchart for illustrating an example of the processing procedure of the communication initialization processing to be executed by the display apparatus 7 in the first embodiment.

(Step S31) When the communication initializer 71 is connected to the information processing device 8 or the printer 1 via the connection cable 102, the communication initializer 71 executes the communication initialization processing.

(Step S32) When the communication initializer 71 is directly connected to the information processing device 8, the communication initializer 71 transmits display apparatus information, which is identification information on the display apparatus 7, to the information processing device 8 via the communicator 72. Alternatively, when the communication initializer 71 is directly connected to the printer 1, the communication initializer 71 transmits the display apparatus information to the printer 1 via the communicator 72.

Figure 11:
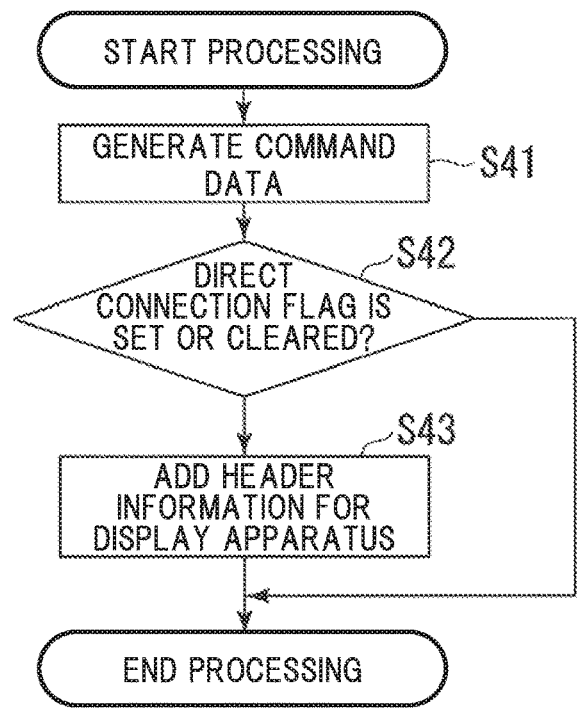
FIG. 11 is a flowchart for illustrating an example of a processing procedure of generating command data to be transmitted by the information processing device to the display apparatus after the communication initialization processing in the first embodiment.

Next, a description is given of an example of a processing procedure of generating command data to be transmitted by the information processing device 8 to the display apparatus 7 after the communication initialization processing. FIG. 11 is a flow chart for illustrating an example of a processing procedure of generating command data to be transmitted by the information processing device 8 to the display apparatus 7 after the communication initialization processing in the first embodiment.

(Step S41) The processor 81 generates command data for the display apparatus.

(Step S42) The processor 81 refers to the storage 82 to determine whether the direct connection flag is set or cleared. When it is determined that the direct connection flag is set (Step S42: "set"), the processor 81 outputs command data for the display apparatus to the display apparatus 7. When it is determined that the direct connection flag is cleared (Step S42: "cleared"), the processor 81 advances the processing to Step S43.

(Step S43) The processor 81 adds header information for the display apparatus to the command data for the display apparatus. After the processing, the processor 81 transmits the command data to the display apparatus 7 via the printer 1.

Figure 12:
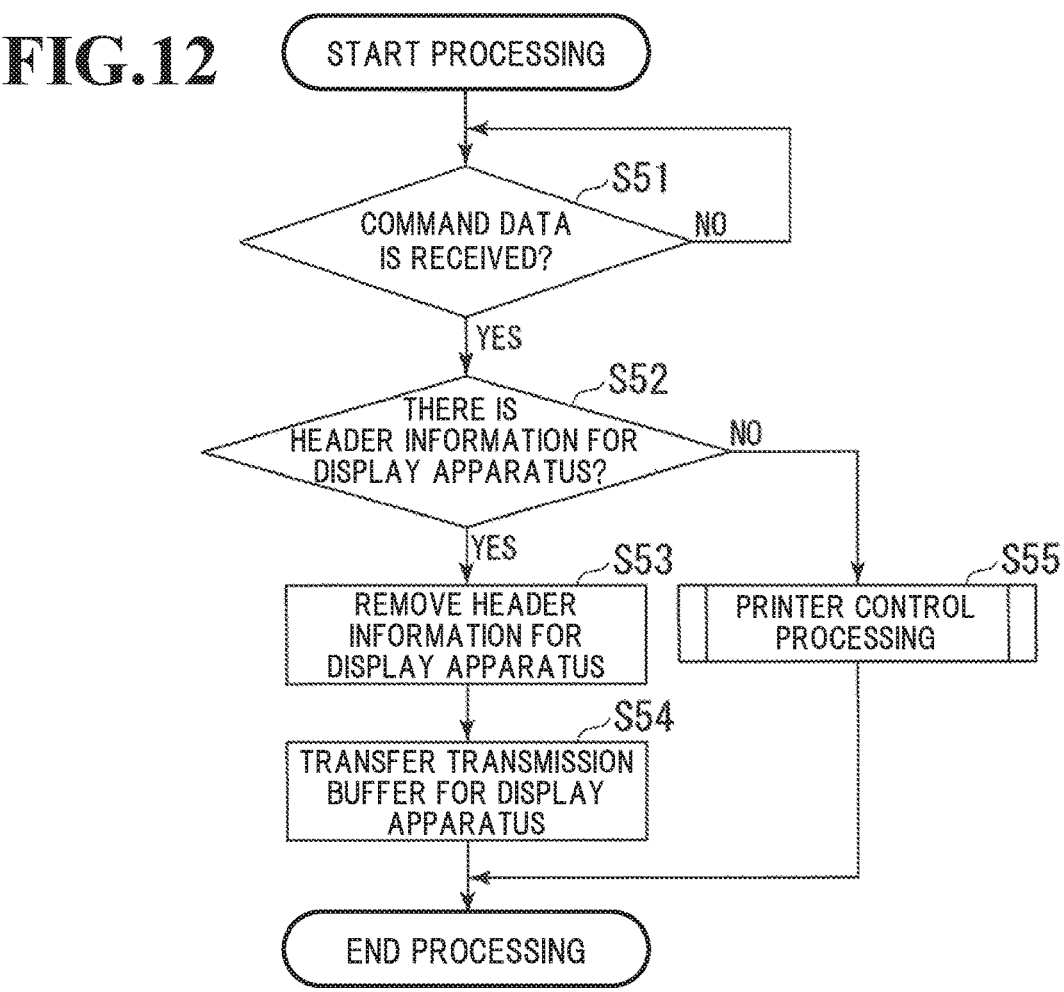
FIG. 12 is a flowchart for illustrating an example of a processing procedure of the printer at a time when the command data is received in the first embodiment.

Next, a description is given of an example of a processing procedure of the printer 1 at a time when command data is received. FIG. 12 is a flowchart for illustrating an example of the processing procedure of the printer 1 at the time when the command data is received in the first embodiment.

(Step S51) The data analyzer 13 determines whether command data is received. When it is determined that command data is received (Step S51: "YES"), the data analyzer 13 advances the processing to Step S52. When it is determined that command data is not received (Step S51: "NO"), the data analyzer 13 repeats the processing of Step S51.

(Step S52) The data analyzer 13 determines whether header information for the display apparatus is added to the command data. When it is determined that header information for the display apparatus is added to the command data (Step S52: "YES"), the data analyzer 13 advances the processing to Step S53. When it is determined that header information for the display apparatus is not added to the command data (Step S52: "NO"), the data analyzer 13 advances the processing to Step S55.

(Step S53) The data analyzer 13 removes the header information for the display apparatus. After the processing, the data analyzer 13 advances the processing to Step S54.

(Step S54) The data analyzer 13 transmits command data from which the header information for the display apparatus is removed to the display apparatus 7 via the second communicator 16. After the processing, the data analyzer 13 ends the processing.

(Step S55) The data analyzer 13 outputs the command data to the controller 14. Next, the controller 14 causes the printing unit 15 to execute printing based on the command data. After the processing, the controller 14 ends the processing.

As described above, in the first embodiment, when the display apparatus 7 is connected to the information processing device 8 via the printer 1, the direct connection flag is cleared. As a result, the information processing device 8 adds header information to command data for the display apparatus 7, and transmits the command data for the display apparatus to which the header information is added to the display apparatus 7 via the printer 1. Further, the information processing device 8 transmits the command data for the printer 1 to the printer 1 without adding header information to the command data. Then, when header information is not added to the received command data, the printer 1 determines that the received command data is command data for the printer, and executes printing processing. Further, when header information is added to the received command data, the printer 1 removes the header information, and transmits command information to the display apparatus 7. Then, the display apparatus 7 displays information on the display 77 (FIG. 6) based on the received command information.

Further, in the first embodiment, when the printer 1 is directly connected to the information processing device 8 and the display apparatus 7 is directly connected to the information processing device 8, the direct connection flag is set. As a result, the information processing device 8 transmits command data for the display apparatus 7 to the printer 1 without adding header information to the command data. The information processing device 8 transmits command data for the printer 1 to the display apparatus 7 without adding header information to the command data. Then, the printer 1 executes printing processing based on the received command data. Further, the display apparatus 7 displays information on the display 77 based on the received command information. That is, the command data received by the display apparatus 7 does not include header information regardless of whether the display apparatus 7 is directly connected to the information processing device 8 or the display apparatus 7 is connected to the information processing device 8 via the printer 1.

As a result, according to the first embodiment, the printer 1 can extract header information for the display apparatus 7 from the command data received from the information processing device 8. Then, the printer 1 transmits to the display apparatus 7 command data from which the header information for the display apparatus 7 is removed to thereby enable the display apparatus 7 to execute the same analysis processing as that for command data transmitted from the information processing device 8. As a result, according to the first embodiment, the amount of command data received by the display apparatus 7 is smaller than when header information is added. Therefore, it is possible to manufacture the display apparatus 7 in the first embodiment with a circuit configuration that is less expensive than in an apparatus configuration in which header information is added.

In the above-mentioned example, a description has been given of an example of the printer 1 and the display apparatus 7 as an example of an apparatus to be connected to the information processing device 8. However, the apparatus to be connected to the information processing device 8 is not limited thereto. The apparatus to be connected to the information processing device 8 may be, for example, an input device (keyboard, touch panel sensor, and mouse) or a sound reproduction device (speaker). In this case, the sound reproduction device may receive command data including a digital signal from the information processing device 8, and reproduce a sound based on the received command data. Then, when the sound reproduction device is connected via the printer 1, for example, in this manner, the information processing device 8 may transmit command data to which header information for the sound generation device is added to the sound reproduction device via the printer 1. Then, the printer 1 can transmit command data from which header information is removed to the sound reproduction device to thereby obtain an effect similar to that of the display apparatus 7 described above.

Second Embodiment

In the first embodiment, a description has been given of an example in which the information processing device 8 adds or does not add header information depending on a topology of the display apparatus 7. In a second embodiment of the present invention, a description is given of an example in which header information is added to command data to be transmitted to the printer 1 and header information is not added to command data to be transmitted to the display apparatus 7.

The configurations of the information processing device 8, the printer 1, and the display apparatus 7 are similar to those of the first embodiment. Further, communication initialization processing of each of the printer 1 and the display apparatus 7 is similar to that of the first embodiment.

Figure 13:
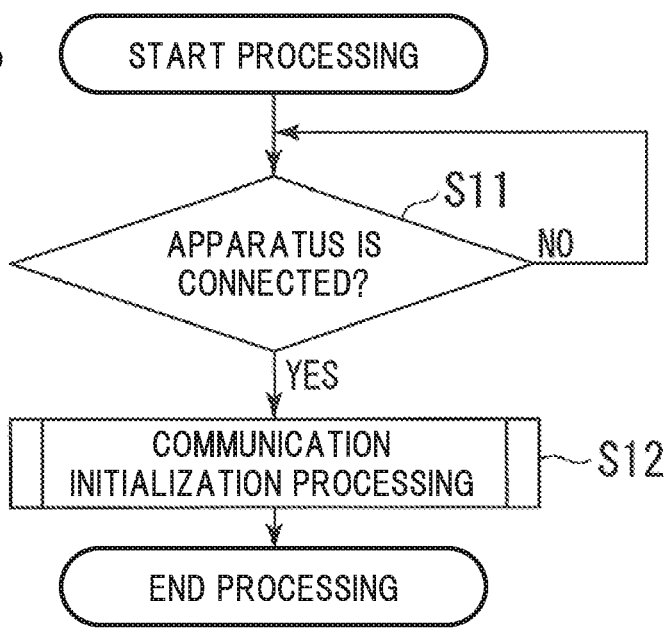
FIG. 13 is a flowchart for illustrating an example of the processing procedure of the communication initialization processing to be executed by an information processing device in a second embodiment of the present invention.

First, a description is given of an example of a processing procedure of communication initialization processing to be executed by the information processing device 8. FIG. 13 is a flowchart for illustrating an example of the processing procedure of the communication initialization processing to be executed by the information processing device 8 in the second embodiment.

(Step S11 and Step S12) The processor 81 executes the processing of Step S11 and Step S12.

Figure 14:
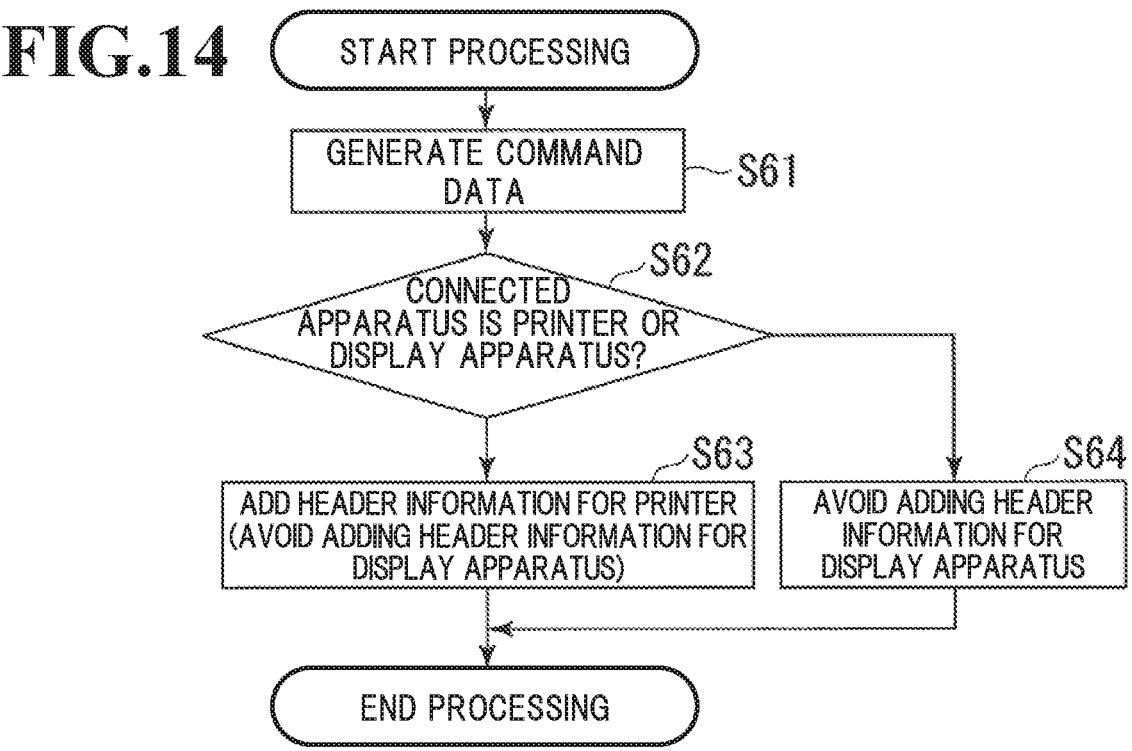
FIG. 14 is a flowchart for illustrating an example of the processing procedure of generating the command data to be transmitted by the information processing device to the printer after the communication initialization processing in the second embodiment.

Next, a description is given of an example of a processing procedure of generating command data to be transmitted by the information processing device 8 to the printer 1 after the communication initialization processing. FIG. 14 is a flowchart for illustrating an example of the processing procedure of generating the command data to be transmitted by the information processing device 8 to the printer 1 after the communication initialization processing in the second embodiment.

(Step S61) The processor 81 generates command data for the printer and command data for the display apparatus.

(Step S62) The processor 81 determines whether the apparatus directly connected to the information processing device 8 is the printer 1 or the display apparatus 7 based on the acquired identification information. When it is determined that the printer 1 is connected (Step S62: "printer"), the processor 81 advances the processing to Step S63. When it is determined that the display apparatus 7 is connected (Step S62: "display apparatus"), the processor 81 advances the processing to Step S64.

(Step S63) The processor 81 adds header information for the printer to command data for the printer, and transmits to the printer 1 the command data for the printer to which the header information is added. When the display apparatus 7 is connected via the printer 1, the processor 81 transmits to the printer 1 the command data for the printer to which the header information is added, and the command data for the display apparatus to which the header information is not added. After the processing, the processor 81 ends the processing.

(Step S64) The processor 81 transmits to the display apparatus 7 command data for the display apparatus to which header information is not added without adding header information for the display apparatus to the command data for the display apparatus. After the processing, the processor 81 ends the processing.

Figure 15:
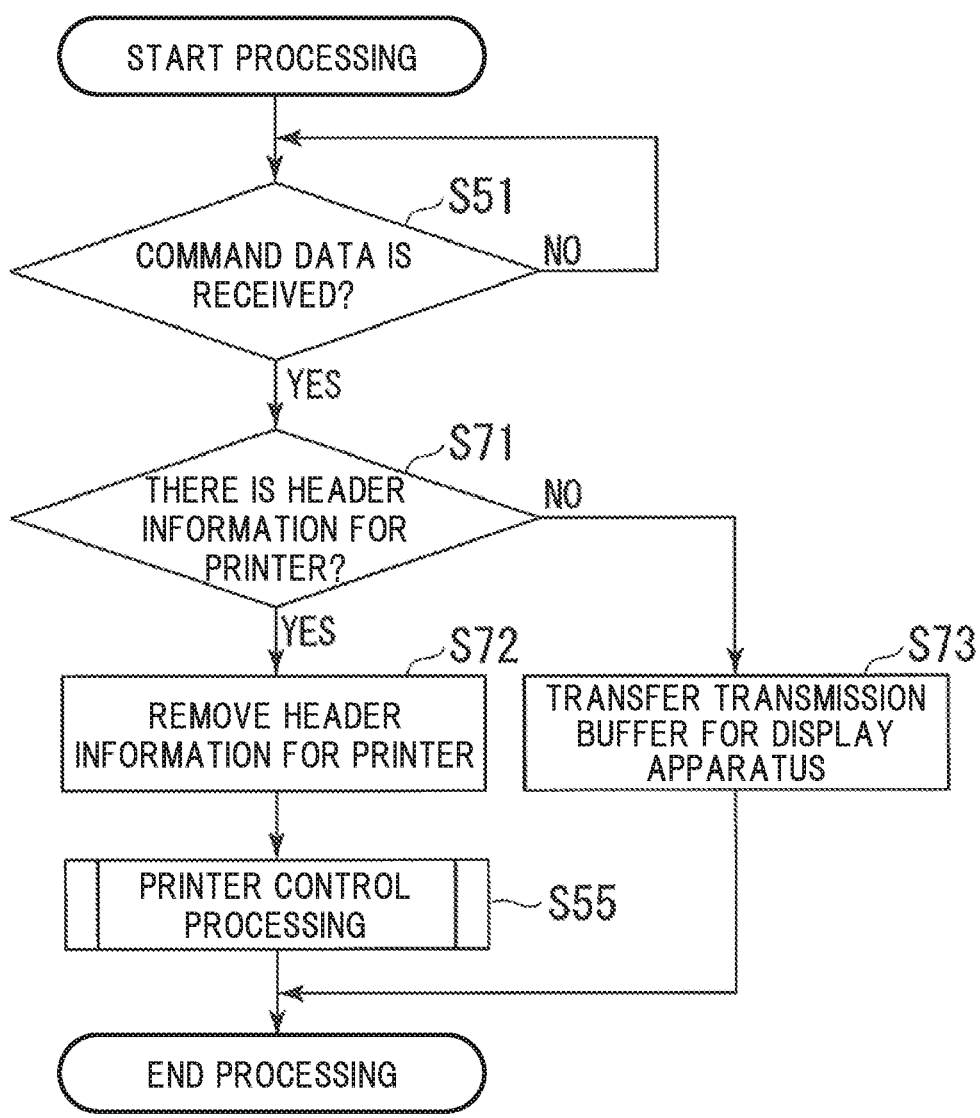
FIG. 15 is a flowchart for illustrating an example of the processing procedure of the printer at a time when the command data is received in the second embodiment.

Next, a description is given of an example of a processing procedure of the printer 1 at a time when command data is received. FIG. 15 is a flowchart for illustrating an example of the processing procedure of the printer 1 at the time when the command data is received in the second embodiment.

(Step S51) The data analyzer 13 executes processing similar to that of Step S51 (FIG. 12). When it is determined that command data is received (Step S51: "YES"), the data analyzer 13 advances the processing to Step S71. When it is determined that command data is not received (Step S51: "NO"), the data analyzer 13 repeats the processing of Step S51.

(Step S71) The data analyzer 13 determines whether header information for the printer is added to the command data. When it is determined that header information for the printer is added to the command data (Step S71: "YES"), the data analyzer 13 advances the processing to Step S72. When it is determined that header information for the printer is not added to the command data (Step S71: "NO"), the data analyzer 13 advances the processing to Step S73.

(Step S72) The data analyzer 13 removes the header information for the printer. After the processing, the data analyzer 13 advances the processing to Step S55.

(Step S55) The data analyzer 13 executes processing similar to that of Step S55 (FIG. 12). After the processing, the controller 14 ends the processing.

(Step S73) The data analyzer 13 transmits command data to which header information is not added to the display apparatus 7 via the second communicator 16. After the processing, the data analyzer 13 ends the processing.

In this manner, in the second embodiment, when two apparatus are connected to the information processing device 8, header information is not added to one apparatus, but added to the other apparatus.

As described above, in the second embodiment, the information processing device 8 adds header information to command data for the printer 1, and transmits to the printer 1 command data for the printer to which the header information is added. Further, in the second embodiment, when the display apparatus 7 is connected to the information processing device 8 via the printer 1, the information processing device 8 transmits to the printer 1 command data for the printer to which header information is added, and command data for the display apparatus to which header information is not added. In this case, the printer 1 transmits to the display apparatus 7 command data for the display apparatus to which header information is not added. Further, in the second embodiment, when the display apparatus 7 is directly connected to the information processing device 8, the information processing device 8 does not add header information to command data for the display apparatus 7, and transmits to the display apparatus 7 command data for the display apparatus 7 to which header information is not added.

Also in this case, command data received by the display apparatus 7 does not include header information regardless of whether the display apparatus 7 is directly connected to the information processing device 8 or the display apparatus 7 is connected to the information processing device 8 via the printer 1. As a result, according to the second embodiment as well, it is possible to construct the circuit of the display apparatus 7 inexpensively similarly to the first embodiment.

A program for implementing a part or all of the functions of the information processing device 8 and the printer 1 in at least one embodiment of the present invention may be recorded into a computer-readable recording medium, and the program recorded in this recording medium may be read into a computer system for execution to thereby execute all or a part of the processing to be executed by the information processing device 8 and the printer 1. It is assumed that the "computer system" includes an OS or a piece of hardware, for example, a peripheral device. Further, it is assumed that the "computer system" includes a WWW system having a webpage provision environment (or display environment). Further, the term "computer-readable recording medium" refers to a portable medium such as a flexible disk, a magneto-optical disk, a ROM, or a CD-ROM, or a storage device, for example, a hard disk drive incorporated in the computer system. Further, it is assumed that the "computer-readable recording medium" includes a medium holding a program for a fixed period of time, for example, a volatile memory (RAM) inside the computer system serving as a server or a client in a case where a program is transmitted via a network, for example, the Internet, or a communication line, for example, a telephone line.

Further, the above-mentioned program may be transmitted from a computer system storing the program in a storage device, for example, to another computer system via a transmission medium or by a transmission wave in the transmission medium. The term "transmission medium" for transmitting the program refers to a medium having a function of transmitting information such as a network (communication network), for example, the Internet, or a communication line, for example, a telephone line. Further, the above-mentioned program may be a program for implementing a part of the above-mentioned function. Further, the above-mentioned program may be a so-called difference file (difference program) that can implement the above-mentioned function in cooperation with a program already stored in the computer system.

This concludes the descriptions of the embodiments as modes for carrying out the present invention. However, the present invention is not limited to the embodiments in any way, and various modifications and substitutions can be made within the scope that does not depart from the spirit of the present invention.

What is claimed is:

1. A printer system, comprising:
an information processing device;
a printer; and
a display apparatus,
the information processing device being configured to control the printer and the display apparatus,
wherein a topology of the information processing device and the display apparatus includes a first topology in which the display apparatus is directly connected to the information processing device and a second topology in which the printer connects the information processing device to the display apparatus, and
wherein the information processing device includes a processor configured to:
transmit, to the display apparatus, instruction data for the display apparatus without adding header information to the instruction data in the first topology; and
transmit, to the printer, instruction data for the display apparatus by adding header information to the instruction data in the second topology.

2. The printer system according to claim 1,
wherein the printer includes:
two printer connection portions; and
an analysis processor, and
wherein the analysis processor of the printer is configured to:
determine whether header information is added to instruction data when the information processing device is connected to a first printer connection portion of the two printer connection portions, the display apparatus is connected to a second printer connection portion of the two printer connection portions, and the analysis processor has received the instruction data from the information processing device;
determine the instruction data to which the header information is added as the instruction data for the display apparatus; and
transmit, to the display apparatus, the instruction data from which the header information is removed.

3. A printer, comprising:
a first printer connection portion;
a second printer connection portion; and
an analysis processor, wherein the analysis processor connects the first printer connection portion to the second printer connection portion, and
wherein the analysis processor is configured to:
determine whether header information is added to instruction data when an information processing device configured to control the printer and a display apparatus is connected to the first printer connection portion, the display apparatus is connected to the second printer connection portion, and the analysis processor has received the instruction data from the information processing device;
determine the instruction data to which the header information is added as instruction data for the display apparatus; and
transmit, to the display apparatus, the instruction data from which the header information is removed.

4. A printer system, comprising:
an information processing device;
a printer; and
a display apparatus,
the information processing device being configured to control the printer and the display apparatus,
wherein the information processing device includes:
two connection portions; and
a processor,
wherein a topology of the printer and the display apparatus includes: a first topology in which the printer is connected to a first connection portion of the two connection portions; a second topology in which the display apparatus is connected to a second connection portion of the two connection portions; and a third connection topology in which the printer connects the display apparatus to one of the first connection portion or the second connection portion, and
wherein the processor of the information processing device is configured to, in any of the first topology, the second topology, and the third topology:
transmit, to the printer, instruction information to which header information is added; and
transmit, to the display apparatus, instruction data without adding header information to the instruction data.

5. The printer system according to claim 4,
wherein the printer includes:
two printer connection portions; and
an analysis processor,
wherein the analysis processor of the printer is configured to:
determine whether header information is added to instruction data when the information processing device is connected to a first printer connection portion of the two printer connection portions, the display apparatus is connected to a second printer connection portion of the two printer connection portions, and the analysis processor has received the instruction data from the information processing device;

determine the instruction data to which the header information is added as instruction data for the printer, to thereby execute printing based on the instruction data from which the header information is removed; and determine the instruction data to which the header information is not added as instruction data for the display apparatus, to thereby transmit, to the display apparatus, the instruction data to which the header information is not added.

6. A printer, comprising:

a first printer connection portion;

a second printer connection portion; and an analysis processor, wherein the analysis processor connects the first printer connection portion to the second printer connection portion, and wherein the analysis processor is configured to:
 determine whether header information is added to instruction data when the information processing device configured to control the printer and a display apparatus is connected to the first printer connection portion, the display apparatus is connected to the second printer connection portion, and the analysis processor has received the instruction data from the information processing device;
 determine the instruction data to which the header information is added as instruction data for the printer, to thereby execute printing based on the instruction data from which the header information is removed; and
 determine the instruction data to which the header information is not added as instruction data for the display apparatus, to thereby transmit, to the display apparatus, the instruction data to which the header information is not added.

7. A method of controlling a printer system, the printer system including:
 an information processing device;
 a printer; and
 a display apparatus,
 the information processing device being configured to control the printer and the display apparatus,
 the information processing device including a processor,
 the printer including:
  a first printer connection portion;
  a second printer connection portion; and
  an analysis processor, wherein the analysis processor connects the first printer connection portion to the second printer connection portion,
a topology of the information processing device and the display apparatus including a first topology in which the display apparatus is directly connected to the information processing device and a second topology in which the printer connects the information processing device to the display apparatus, the method comprising:

transmitting, to the display apparatus, by the processor of the information processing device, instruction data for the display apparatus without adding header information to the instruction data in the first topology;

transmitting, to the printer, by the processor of the information processing device, instruction data for the display apparatus by adding header information to the instruction data in the second topology;

determining, by the analysis processor of the printer, whether header information is added to instruction data when the information processing device is connected to the first printer connection portion, the display apparatus is connected to the second printer connection portion, and the analysis processor has received the instruction data from the information processing device; and determining, by the analysis processor of the printer, the instruction data to which the header information is added as the instruction data for the display apparatus, to thereby transmit, to the display apparatus, the instruction data from which the header information is removed.

8. A method of controlling a printer, the printer including:
 a first printer connection portion;
 a second printer connection portion; and
 an analysis processor, wherein the analysis processor connects the first printer connection portion to the second printer connection portion,
the method comprising:
 determining, by the analysis processor, whether header information is added to instruction data when an information processing device configured to control the printer and a display apparatus is connected to the first printer connection portion, the display apparatus is connected to the second printer connection portion, and the analysis processor has received the instruction data from the information processing device; and
 determining, by the analysis processor, the instruction data to which the header information is added as instruction data for the display apparatus, to thereby transmit, to the display apparatus, the instruction data from which the header information is removed.

9. A method of controlling a printer system, the printer system including:
 an information processing device;
 a printer; and
 a display apparatus,
 the information processing device being configured to control the printer and the display apparatus,
 the information processing device including:
  two connection portions; and
  a processor,
 the printer including:
  a first printer connection portion;
  a second printer connection portion; and
  an analysis processor, wherein the analysis processor connects the first printer connection portion to the second printer connection portion,
 a topology of the printer and the display apparatus including: a first topology in which the printer is connected to a first connection portion of the two connection portions; a second topology in which the display apparatus is connected to a second connection portion of the two connection portions; and a third topology in which the printer connects the display apparatus to one of the first connection portion or the second connection portion, and
the method comprising:
 transmitting, to the printer, by the processor of the information processing device, instruction information to which header information is added in any of the first topology, the second topology, and the third topology;

transmitting, to the display apparatus, by the processor of the information processing device, instruction data without adding header information to the instruction data;

determining, by the analysis processor of the printer, whether header information is added to instruction data when the information processing device is connected to the first printer connection portion, the display apparatus is connected to the second printer connection portion, and the analysis processor has received the instruction data from the information processing device;

determining, by the analysis processor of the printer, the instruction data to which the header information is added as instruction data for the printer, to thereby execute printing based on the instruction data from which the header information is removed; and determining, by the analysis processor of the printer, the instruction data to which the header information is not added as instruction data for the display apparatus, to thereby transmit, to the display apparatus, the instruction data to which the header information is not added.

10. A method of controlling a printer, the printer including:
   a first printer connection portion;
   a second printer connection portion; and
   an analysis processor, wherein the analysis processor connects the first printer connection portion to the second printer connection portion,
the method comprising:
   determining, by the analysis processor, whether header information is added to instruction data when an information processing device configured to control the printer and a display apparatus is connected to the first printer connection portion, the display apparatus is connected to the second printer connection portion, and the analysis processor has received the instruction data from the information processing device; and
   determining, by the analysis processor, the instruction data to which the header information is added as instruction data for the printer, to thereby execute printing based on the instruction data from which the header information is removed; and
   determining, by the analysis processor, the instruction data to which the header information is not added as instruction data for the display apparatus, to thereby transmit, to the display apparatus, the instruction data to which the header information is not added.

* * * * *